UNITED STATES PATENT OFFICE.

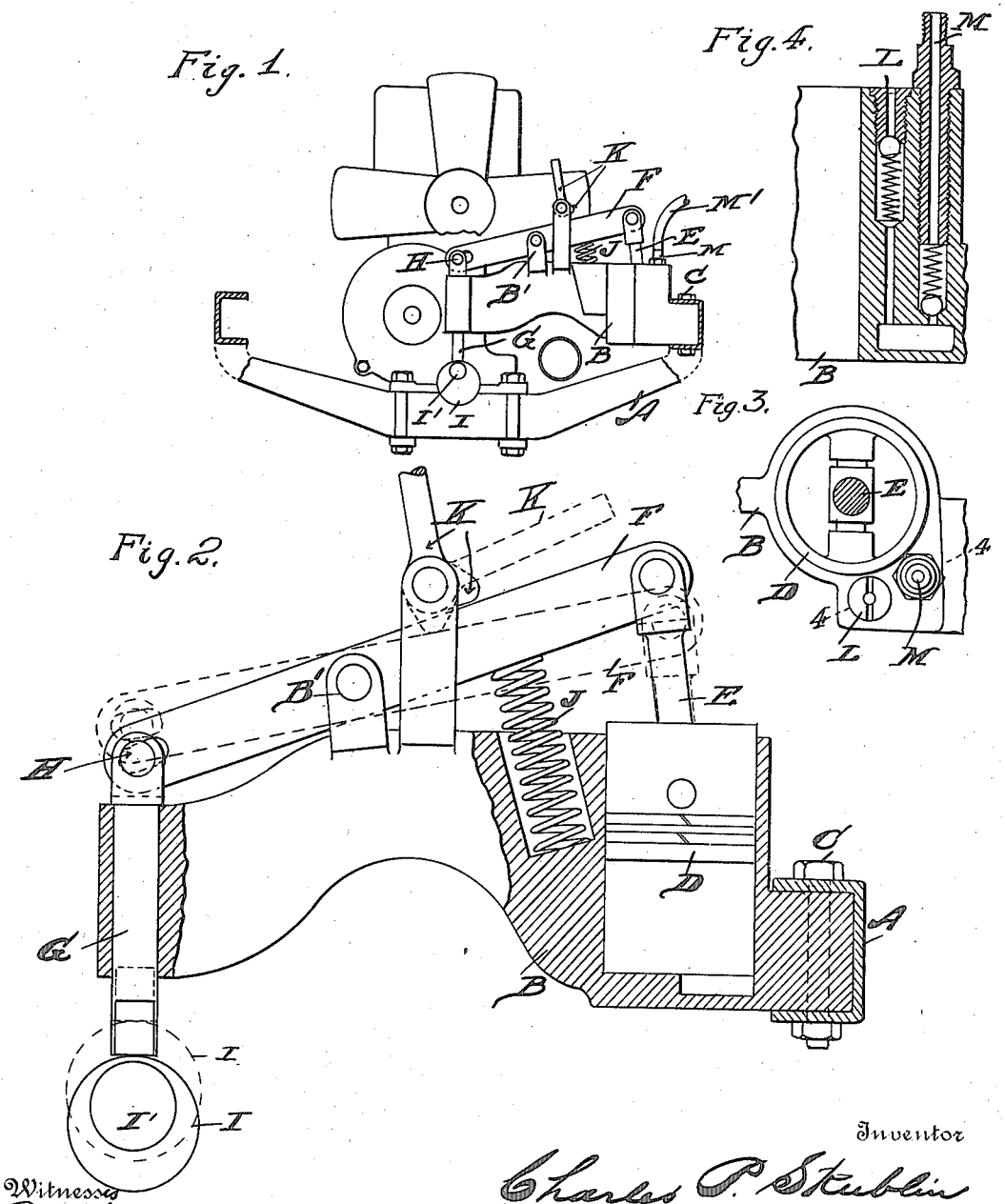

CHARLES P. SKUBLIN, OF DETROIT, MICHIGAN, ASSIGNOR TO WILLIAM A. ADAMS, OF DETROIT, MICHIGAN.

TIRE-PUMP.

1,264,986.  Specification of Letters Patent.  Patented May 7, 1918.

Application filed May 28, 1917. Serial No. 171,471.

*To all whom it may concern:*

Be it known that I, CHARLES P. SKUBLIN, a Russian subject, residing at Detroit, county of Wayne, State of Michigan, have invented a certain new and useful Improvement in Tire-Pumps, and declare the following to be a full, clear, and exact description of the same, such as will enable others skilled in the art to which it pertains to make and use the same, reference being had to the accompanying drawings, which form a part of this specification.

My invention relates to an improvement in tire pumps shown in the accompanying drawings and more particularly described in the following specification and claims.

The object of this invention is to provide a device of relatively few parts, of inexpensive construction, and simple in operation;— and while adapted for use on automobiles generally is especially designed for installation upon the so-called "Ford" car.

Another object of the invention is to provide a powerful and quick acting pump adapted to be actuated by the motor of the vehicle in which the usual driving gears employed in devices of this character are eliminated.

With the foregoing and other objects in view which will appear as the description proceeds, the invention resides in the details of construction hereinafter described and claimed, it being understood that changes in the precise embodiment of the invention herein disclosed may be made without departing from the spirit of the same.

In the drawings accompanying this specification, Figure 1 is a fragmentary front-end elevation of a motor vehicle, with parts broken away and in section, showing the pump installed thereon. Fig. 2 is an elevation of the device with parts in section, showing in dotted lines the actuating mechanism in "released" position, and indicating diagrammatically the driving cam carried by the crank shaft of the motor. Fig. 3 is a fragmentary plan view of the pump cylinder, showing the location of the inlet and discharge ports. Fig. 4 is a detail sectional view on line 4—4 of Fig. 3, showing the inlet and discharge ports and the respective check valves controlling the same.

Referring now to the letters of reference placed upon the drawings.—A, denotes the frame of the vehicle, B, indicates the main casting or wall of the device, secured to the frame by a bolt C. D, designates the piston of the pump, E, indicates the piston rod, connected to one end of the oscillating lever F,—in turn pivoted to a lug B', rising from the wall of the device. The lug to which the oscillating lever is pivoted may be positioned to either increase or reduce the "throw" of the piston as desired.

G, denotes a movable rod sleeved in the main casting, B, its upper end having an operative connection with the oscillating lever F, which is slotted to receive a transverse bolt H, connecting the parts together. I, indicates a cam mounted upon the crank shaft I', of the engine, adapted to act upon the rod G, to operate the lever F, against the action of the spring J,—projecting from a recess in the main casting.

K, is a cam-shaped lever pivoted in a standard integral with the casting B, adapted when manually operated to force the lever F, downward against the action of the spring J, that the rod G, may be raised out of operative contact with the revolving cam I, carried by the crank shaft of the engine.

L, is an air inlet port controlled by a suitable check valve, and M, is air outlet port, also controlled by suitable check valve, to which a hose M', is connected for the delivery of air to a tire.

Having indicated the several parts by reference letters, the construction and operation of the device will be readily understood.

When it is desired to pump up a tire,—a hose connection between the pump and tire is first established;—the manually operated lever is then thrown so as to release the oscillating lever that the spring J, may be free to force the rod G, into operative contact with the cam I;—which in turn actuates the oscillating lever against the action of the spring, driving the piston to the end of its stroke and forcing air into the tire under pressure,—the spring returning the piston to its initial position.

Having thus described my invention, what I claim is:—

1. In a tire pump, the combination of a casting adapted for engagement with the chassis of a vehicle having a pump cylinder formed therein, a reciprocating piston, an oscillating lever pivoted to the casting, a piston rod connecting the piston with one end of the lever, a sliding rod sleeved in the casting connected with the other end of the lever, a spring adapted to bear against the lever to force the piston to one end of its stroke, and a cam actuated by a prime mover adapted to operate said sliding rod against the action of the spring, whereby the piston is reciprocated.

2. In a device of the character described, the combination of a prime mover, a cam actuated thereby, of a casting adapted for attachment to the frame of a motor vehicle having a pump cylinder formed therein, a reciprocating piston for said cylinder, an oscillating lever pivoted to the casting, a piston rod connecting the piston with one end of the oscillating lever, a sliding rod sleeved in the casting pivotally connected with the other end of the oscillating lever, a spring supported by the casting adapted to force the sliding rod into operative relation with the cam, and manually operated means adapted to bear upon the oscillating lever to hold said sliding rod out of operative relation with the cam and against the action of the spring.

In testimony whereof, I sign this specification in the presence of two witnesses.

CHARLES P. SKUBLIN.

Witnesses:
S. E. THOMAS,
N. H. HOUSE.